US006311226B1

(12) United States Patent
Rosen et al.

(10) Patent No.: US 6,311,226 B1
(45) Date of Patent: *Oct. 30, 2001

(54) METHOD AND APPARATUS FOR DYNAMIC LINK NAME NEGOTIATION

(75) Inventors: Jonathan Rosen, Chapel Hill, NC (US); Dean Hiller, Shrub Oak, NY (US); Robert O'Gorman, Raleigh, NC (US); Mark C. Drummond, Catonsville, MD (US)

(73) Assignee: Cisco Technology, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/920,713

(22) Filed: Aug. 29, 1997

(51) Int. Cl.[7] ............................. G06F 9/00; G06F 15/173; G06F 9/46; G06F 15/163
(52) U.S. Cl. ............................................ 709/310; 702/227
(58) Field of Search ..................... 709/303, 300, 709/200–253, 310–332

(56) References Cited

U.S. PATENT DOCUMENTS

| | | | |
|---|---|---|---|
| 4,718,005 | * 1/1988 | Feigenbaum et al. | 709/222 |
| 5,014,265 | 5/1991 | Hahne et al. | |
| 5,072,449 | 12/1991 | Enns et al. | |
| 5,128,945 | 7/1992 | Enns et al. | |
| 5,260,936 | 11/1993 | Bardet et al. | |
| 5,280,470 | 1/1994 | Buhrke et al. | |
| 5,341,478 | * 8/1994 | Travis et al. | 709/203 |
| 5,386,512 | 1/1995 | Crisman et al. | 395/200 |
| 5,430,842 | 7/1995 | Thompson et al. | |
| 5,491,802 | 2/1996 | Thompson et al. | |
| 5,546,549 | 8/1996 | Barrett et al. | 395/309 |
| 5,555,374 | 9/1996 | Armerding et al. | 395/200.02 |
| 5,621,894 | 4/1997 | Menezes et al. | 395/200.12 |
| 5,632,021 | 5/1997 | Jennings et al. | 395/309 |
| 5,636,371 | 6/1997 | Yu | |
| 5,663,952 | 9/1997 | Gentry, Jr. | |
| 5,699,532 | 12/1997 | Barrett et al. | 395/309 |
| 5,729,689 | * 3/1998 | Allard et al. | 709/228 |
| 5,764,887 | * 6/1998 | Kells et al. | 713/200 |
| 5,835,725 | * 11/1998 | Chiang et al. | 709/228 |
| 5,964,831 | * 10/1999 | Kearns et al. | 709/201 |

OTHER PUBLICATIONS

Beitz et al; "Service location in an Open distributed environment", IEEE digital library, 1995.*
Heimbigner et al; "A Federated Architecture for Information Management"; ACM digital library, 1985.*

* cited by examiner

*Primary Examiner*—Majid Banankhah
*Assistant Examiner*—P Caldwell
(74) *Attorney, Agent, or Firm*—Cesari and McKenna, LLP

(57) ABSTRACT

A technique allows dynamic negotiation of application names executing on nodes of a computer network for creating a data link for communication between the nodes. Dynamic negotiation is effected through an exchange of novel control messages over a control link used to establish application-application logical links between the nodes. The control messages instruct the nodes to create applications having names specified within predetermined fields of the messages. The technique obviates the need for a system administrator to issue configuration commands to a responding node to statically configure that latter node for communication over a network.

22 Claims, 4 Drawing Sheets

METHOD AND APPARATUS FOR DYNAMIC LINK NAME NEGOTIATION

CROSS-REFERENCE TO RELATED APPLICATIONS

This invention is related to the following copending U.S. Patent Applications:

U.S. patent application Ser. No. 08/920,714 titled, Option Request Protocol, filed Aug. 29, 1997;

U.S. patent application Ser. No. 08/921,158 titled, IP Checksum Offload, filed Aug. 29, 1997;

U.S. patent application Ser. No. 09/149,719 titled, Enhanced CLAW Packing Protocol, filed Sep. 8, 1998; and U.S. patent application Ser. No. 09/197,225 titled, Ensuring Accurate Data Checksum, filed Nov. 20, 1998.

BACKGROUND OF THE INVENTION

Data communication in a computer network involves the exchange of data between two or more entities interconnected by communication links. The entities are typically software programs executing on hardware computer platforms, such as nodes; in particular, communication software executing on the nodes correlate and manage data communication with other nodes. The nodes typically communicate by exchanging discrete packets or frames of data according to predefined protocols. In this context, a protocol consists of a set of rules defining how the nodes interact with each other. Collectively, these hardware and software components comprise a communications network and their interconnections are defined by an underlying architecture.

Modem communications network architectures are typically organized as a series of hardware and software levels or "layers" within each node that interact to format data for transfer over the network. Predetermined services are performed on the data as it passes through each layer and the layers communicate with each other by means of the predefined protocols. The lower layers of these architectures are typically implemented in hardware and firmware, whereas the higher layers are generally implemented in the form of software running on the nodes attached to the network. Examples of such communications architectures include the the Internet communications architecture and the Systems Network Architecture (SNA) developed by International Business Machines (IBM) Corporation.

SNA is a mainframe-oriented network architecture that includes services generally similar to those defined in the Internet communications architecture. An SNA network consists of nodes and links, wherein the nodes are network components containing protocol implementations and the links are transmission facilities that carry data between two nodes configured to operate a data link control procedure. Examples of such nodes include a host mainframe computer, a control unit and an input/output (I/O) device that provides a user interface to the network. In one embodiment of the SNA network, the control unit and I/O device may be combined within a node, such as a workstation and in another embodiment, the control unit may be independent of the workstation and include a router to enable routing of data through the network to destination nodes, such as workstations.

The host is typically connected to the control unit through a high-performance communication subsystem called a mainframe channel. The channel comprises a plurality of components including an intelligent processor (i.e., channel CPU) that manages the protocol over the communications link and controls transfer of data between host (main memory) storage and I/O devices directly attached to the control unit. To that end, a channel may use one or more channel paths as the actual links between a host and the control unit. Channel paths include physical transmission links between the channel and control unit; examples of channel paths include bus-and-tag and enterprise system connection (ESCON) channel paths. Moreover, each I/O device is represented by a subchannel. A subchannel is similar to a virtual circuit in that it provides information about the associated I/O device and its attachment to the channel.

To transfer data in connection with an I/O operation, the channel CPU executes channel command words (CCWs) once started by a start subchannel operation. The start subchannel command is issued by the host CPU to instruct the channel CPU as to the location of a channel program; this command also specifies the subchannel on which the channel program should execute. The channel program consists of a collection of CCWs; the CCWs are the actual I/O commands (read, write, status, etc) that cause information to flow between the host and an I/O device. The control unit interprets these CCWs and adapts them to fit the characteristics of different I/O devices. Upon issuing a start subchannel operation, the host CPU is released to pursue other processing while the channel organizes the data referenced by the channel program and synchronizes its transfer between the I/O device and main memory.

Communication between a channel and control unit is typically governed by various protocols; a protocol originally developed by IBM Corporation for improving the efficiency of data communication between a host computer and a control unit is the common link access to workstation (CLAW) protocol. In a CLAW environment, the control unit is coupled to a CLAW device, which is typically a software entity executing on a node, such as a workstation. Data communication takes place over a channel via the exchange of data packets between the workstation and host. The CLAW protocol achieves data communication efficiency, in part, by avoiding host CPU interrupts during I/O operations through the continuous execution of channel programs over two subchannels: one for write operations and one for read operations.

Logical links are defined in CCWs for read and write operations to establish multiple logical connections within each subchannel directed to different applications executing on the host and workstation. In fact, a main goal of the CLAW protocol is to enable efficient switching among applications specified by the logical links to facilitate data transfers to appropriate outbound interfaces (e.g., FDDI or Ethernet). Accordingly, the logical links are a way to multiplex within a subchannel.

The CLAW protocol generally defines (i) command codes associated with CCWs and (ii) the order in which those command codes are specified in a CCW chain. A logical link number (0–31) is embedded in the CCW command code, wherein number 0 is reserved for a control link and numbers 1–31 specify application-to-application (data) links. The control link path is part of a read/write subchannel pair dedicated to CLAW protocol communication. The host CPU builds a channel program comprising a chain of CCW data structures in main memory that contain instructions (e.g., read, read header, write, transfer-in-channel (TIC)). These instructions are then executed in accordance with the CLAW protocol.

The CLAW protocol also defines two primary sets of control flows over the control link: system validate/system validate response and connection request sequence. The system validate/system validate response control flows are manifested as message packets that propagate over the control link, passing information as data within a predetermined packet format. Before sending data, a system validate/response message flow occurs over the control link to verify the names of the workstation and host.

The workstation and host names are configuration parameters used to ensure that the host is communicating with a proper workstation. If the workstation (or host) name contained in the system validate message is incorrect, a control application provides a non-match return code in the system validate response message along with the expected name. Upon completion of the system validate/response exchange, the control link (0) has been brought up and the host is "aware" of the workstation to which it is connected. However, logical data links still need to be established for application-to-application data communication.

In order to establish a data link between two communicating applications, a connection request sequence is executed between the host and workstation. A control application resident on the host is typically responsible for initiating the connection request sequence to establish logical links (1–31) for data transfers between applications. A channel adapter within the control unit/workstation controls logical link assignments for applications executing on the workstation. The connection request sequence operates to establish the actual links used for host application-to-workstation application data transfers; once established, various types of data flow over these application-application links (e.g., a Transmission Control Protocol/Internet Protocol (TCP/IP) application has IP packets flowing over the link).

The connection request originates in the host over control link 0 and is sent to the channel adapter which selects an available link and alters the connection request to reference that link. The adapter then passes the connection request onto the targeted application of the workstation. The channel adapter sends the connection response back to the host over the control link. If the workstation does not agree with the name of its application specified in the request, it returns a disconnect command; otherwise, a connection confirm response is provided to the host and the link is ready for data transfer.

The host CPU then issues a start subchannel (SSCH) command to the channel CPU instructing that latter CPU to initiate an I/O operation to the targeted application. The channel CPU executes the SSCH command, which points to the beginning of a CCW chain of a channel program in main memory. In the case of a read (or write) channel program, the channel CPU gains control of the program, reads each CCW in sequence and executes it to initiate the flow of data, along with the CCW command code, over the physical channel wire and through the control unit to the targeted application.

For each received CCW command code, the control unit responds with either "Yes", "Invalid Command" or "Busy". A yes response is followed by execution of the CCW command. Either the channel or the control unit can terminate an I/O operation. Termination implies that the targeted application has received or provided all data assoiated with the I/O operation and no longer requires channel facilities. Control unit initiated I/O termination indicates that the I/O operation has completed and the control unit is ready to execute another operation.

The conventional CLAW protocol described above "statically" configures the network system with respect to the functions performed by the control unit or host, or the parameters defining communication over the data links coupling the control unit and host. For example, the host and workstation names are statically configured parameters of the system validate/system validate response exchange, as are the maximum read and write CCW sizes that are sent during the exchange. There is currently no way to negotiate optional functions or parameters in a dynamic manner without having to manually reconfigure the network. Accordingly, there is a need for an out-of-band technique (i.e., outside of the logical application links) for the host to inform the control unit that new, different parameters are to be employed.

SUMMARY OF THE INVENTION

The invention comprises a technique for dynamically negotiating names of applications executing on nodes of a computer network for creating a data link used to communicate among the nodes. Dynamic negotiation is effected through an exchange of novel control messages over a control link used to establish application-application logical links between the nodes. The control messages instruct the nodes to create these applications links having names specified within predetermined fields of the messages. The inventive technique obviates the need for a system administrator to issue configuration commands to a responding node to statically define application names for communication over a network.

In the illustrative embodiment, the nodes are preferably a host computer and a control unit, and the application names are supplied by the node initiating dynamic negotiation within fields of a control message sent to a receiving node. For example, a requesting node (e.g, the host computer) initiates dynamic name negotiation by inserting a host application name and a control unit application name in respective fields of a control message (i.e., an option request message). If the responding node (e.g., the control unit) agrees with the application names specified within the control message, it returns a response (i.e., an option request response) with the supplied names and an acknowledgement code. Negotiation is thus complete and creation of the data link may proceed. If, however, the responding node does not agree with the application name supplied by the requesting node, the responding node returns an option request response having an error code and possibly a different application name.

Advantageously, the inventive technique provides a means for a system to dyamically configure parameters for communication among nodes of the network as opposed to requiring static definitions of these configuration parameters by an administrator. As a result, the technique enhances the overall performance and architecture of the system.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
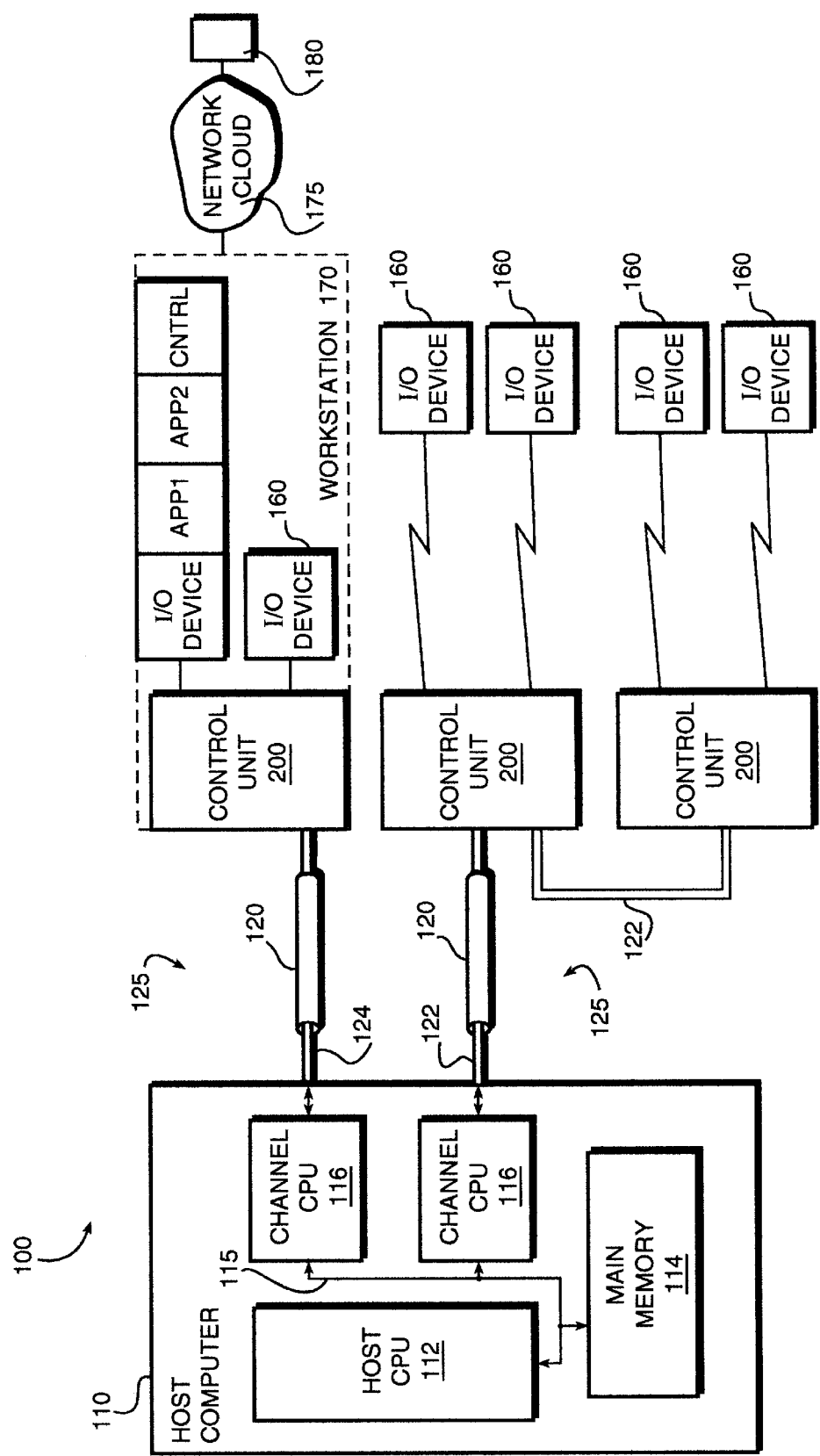
FIG. 1 is a block diagram of a computer network comprising a collection of interconnected nodes, such as a host computer and at least one control unit.

FIG. 1 is a block diagram of a computer network 100 comprising a collection of interconnected nodes, such as a host computer 110 and at least one control unit 200. The host computer comprises a host central processing unit (CPU 112), a main memory 114 and at least one channel CPU 116 interconnected by a bus 115. Communication link 120 couples the channel CPU 116 to the control unit 200 which, in turn, is directly attached to input/output (I/O) devices 160. In an embodiment of the network 100 that may be advantageously used with the invention, the control unit and I/O devices may be combined within an integrated node, such as a workstation 170, which is coupled to an end station 180 via a network (e.g., SNA or IP) cloud 175. In the illustrative embodiment described herein, however, the control unit 200 is an independent node comprising, inter alia, a router for routing data through the network to destination nodes (shown as end stations 180). Communication among the nodes is typically effected by exchanging discrete frames or packets of data according to predefined protocols.

For each node, the memory may comprise storage locations addressable by the CPUs for storing software programs and data structures associated with the inventive protocol and messages. Moreover, the CPUs may comprise processing elements or logic for executing the software programs and manipulating the data structures. An operating system, portions of which are typically resident in memory and executed by the CPU, functionally organizes the node by, inter alia, invoking network operations in support of software processes executing on the node. It will be apparent to those skilled in the art that other CPU and memory means, including various computer readable media, may be used for storing and executing program instructions pertaining to the inventive techniques described herein.

The channel CPU and communication link collectively interact to form a mainframe channel 125 to effectively separate execution of I/O operations from the host computer's execution of data processing programs. Each I/O device 160 is represented by a subchannel (not shown) that provides information about the I/O device and its attachment to the channel 125. Functionally, the channel CPU 116 manages the protocol over the communication link 120 and controls transfer of data directly between main memory 114 and the control unit 200. To that end, the channel CPU may use one or more logical and physical links of the channel 125 as paths between the host and the control unit. Examples of a physical transmission link include a bus-and-tag path 122 and an enterprise system connection (ESCON) path 124.

The bus-and-tag channel path 122 is a byte-wide parallel bus with data on one cable (the "bus") and a set of control lines on another cable (the "tag"). The control lines govern the transfer of control information and data over the parallel bus. For this path implementation, each channel is connected to a first control unit in a chain consisting of 1 to 8 control units. The chain acts as a bus, connecting each channel to a series of control units. The ESCON channel path 124, on the other hand, consists of a pair of fiber optic cables that employ a serial, packet-switching architecture with control information such as packet framing and cyclic redundancy check (CRC) characters. Standard bus-and-tag protocol indications are conveyed within packets instead of through bus-and-tag lines.

Figure 2:
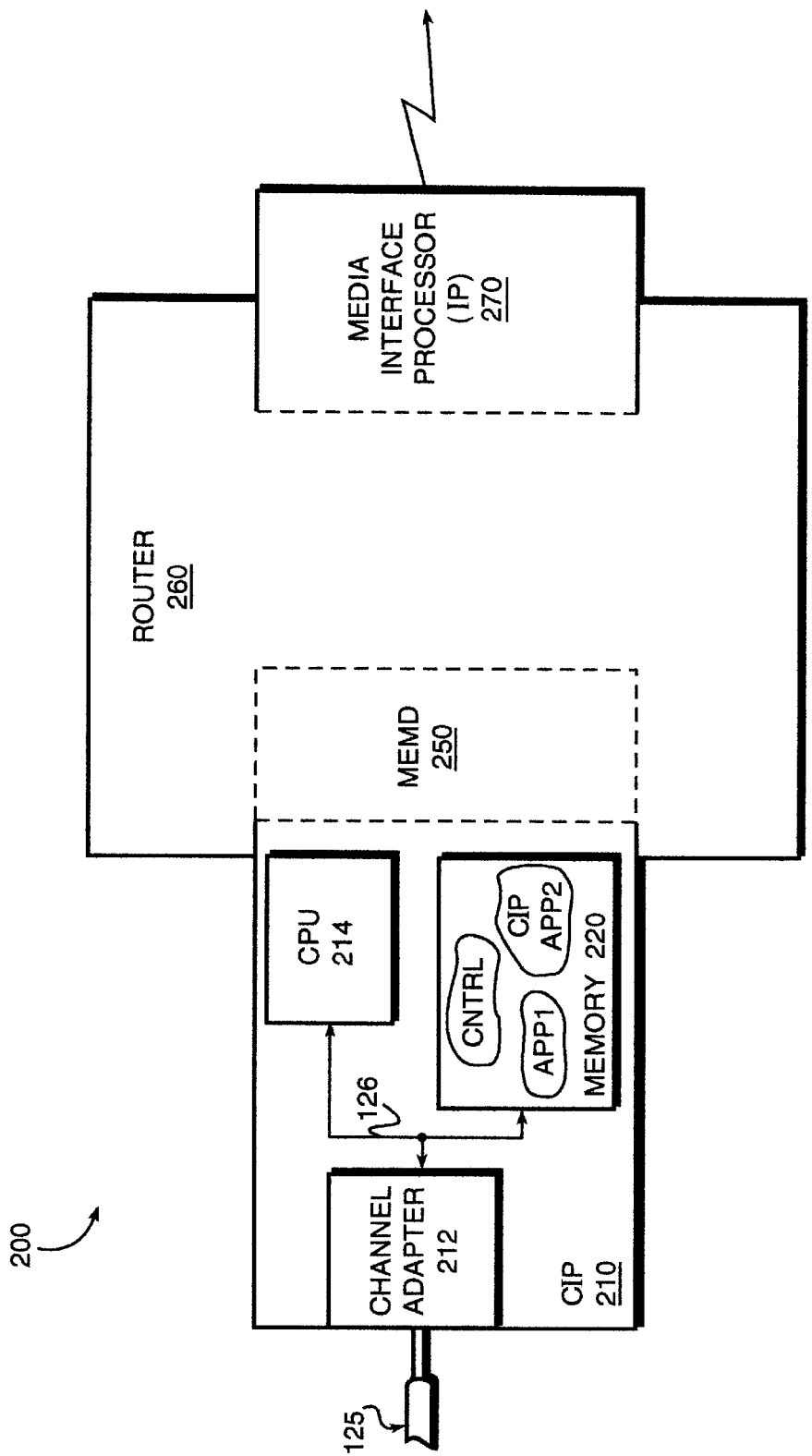
FIG. 2 is a block diagram of the control unit of FIG. 1.

FIG. 2 is a block diagram of an illustrative embodiment of the control unit 200 comprising an inbound or channel interface processor (CIP) 210, a memory switching fabric (MEMD) 250, a router 260 and an outbound or media interface processor (IP) 270. The IP 270 provides an outbound interface connection to a plurality of different wide area and local area network media (e.g., token ring, FDDI and Ethernet) to enable transfer of data packets over those media. The router 260 is configured to facilitate the flow of the data packets throughout the network by routing them to proper destination nodes.

The CIP 210 provides high-performance, multiprotocol network access to the host computer 110 and, to that end, includes a channel adapter 212 that directly couples to the channel 125 and, in particular, to the physical bus-and-tag and ESCON channel paths. A CPU 214 and memory 220 of the CIP cooperate with the channel 125 to relieve the host 110 from tasks associated with direct communication with destination nodes, such as workstations, thereby saving host resources while allowing concurrent data and I/O processing. Control and application programs stored in the memory 220 communicate with respective programs in the host via the exchange of, e.g., Internet protocol (IP) data packets in accordance with a protocol, such as the common link access to workstation (CLAW) protocol.

The CLAW protocol generally defines command codes associated with channel command words (CCWs); logical links are defined in CCWs for read and write operations to establish multiple logical connections within subchannels directed to different applications executing on the host and CIP. The protocol enables efficient switching among applications specified by these logical links to facilitate data transfers to appropriate outbound media through the IP 270. Logical link number 0 is reserved for a control link over which system validate and system validate response messages flow to verify the names of the CIP and host. Logical link numbers 1–31 specify application-to-application (data) links that are established by a connection request sequence between the host and CIP. Once established, various types of data may flow over these application-application links in accordance with specified CLAW parameters.

However, the CLAW protocol "statically" configures network communication according to the CLAW parameters and there is no way to negotiate changes to the parameters in a dynamic manner; that is, changes to the parameters are typically effected by manually reconfiguring the network. The present invention is directed to a technique for dynamically changing these parameters or invoking different options for data communication between the host and a control unit communicating using the CLAW protocol.

In accordance with the invention, a technique is provided for dynamically negotiating names of applications executing on the host 110 and CIP 210 of network 100 for creating a data link for communication between these nodes. Dynamic negotiation is effected through an exchange of novel control messages over the control link used to establish application-application logical links between the nodes. The control messages instruct the nodes to create applications having names specified within predetermined fields of the messages. The inventive technique obviates the need for a system administrator to issue configuration commands to a responding node to statically configure that latter node for communication over a network.

Figure 3:
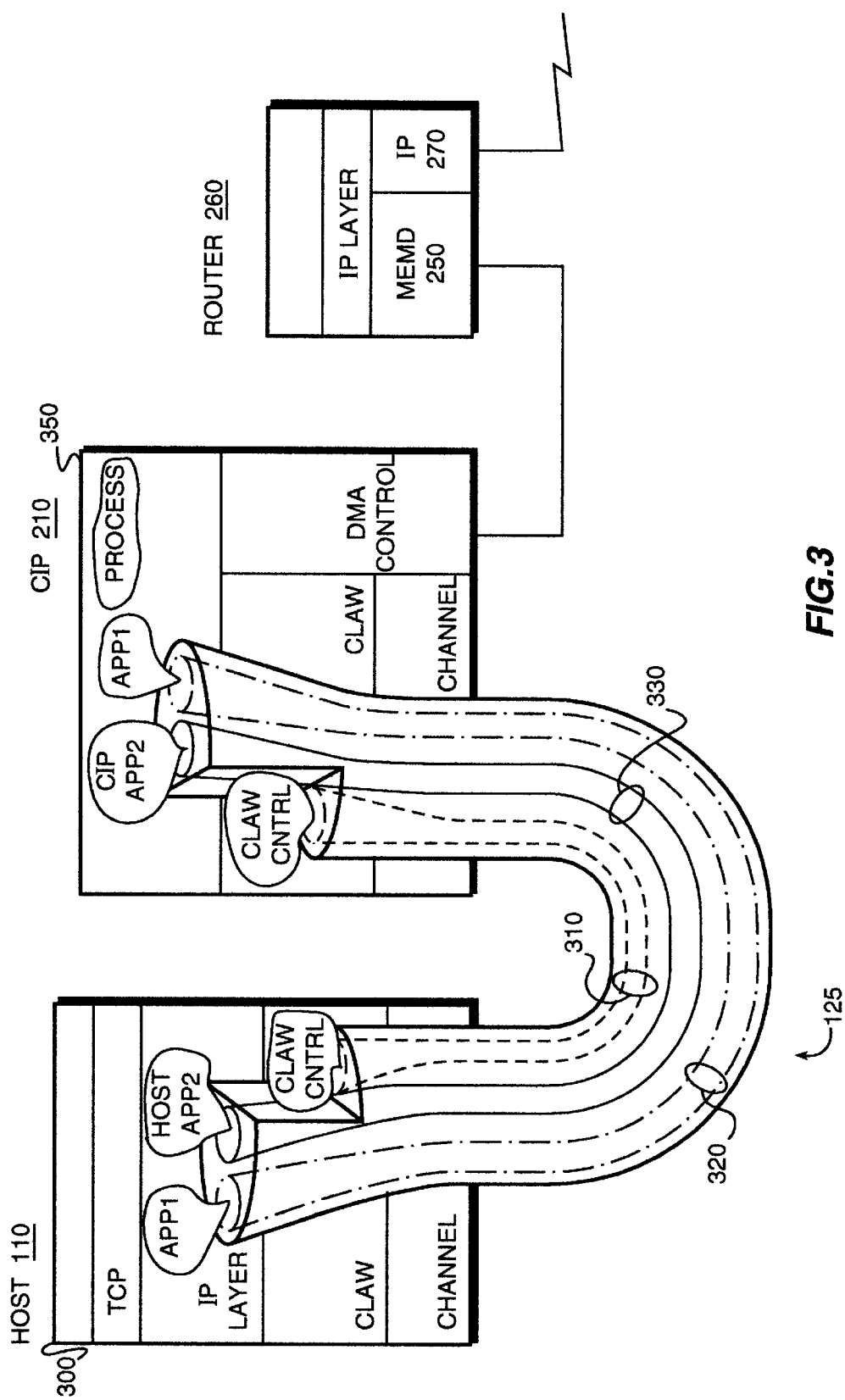
FIG. 3 is a schematic block diagram of protocol stacks within the host computer and the control unit for performing operations relating to a dynamic name negotiation protocol according to the present invention.

In the illustrative embodiment, the application names are supplied by the node initiating negotiation by inserting them in fields of a control message sent to a responding node. Either the CIP or host may function as a requester to initiate dynamic negotiation of the application names by issuing an option request message over the control link. For example, the host functions as a requester when generating and sending an option request message containing a host application name and a CIP application name in respective fields of the message to the control unit. FIG. 3 is a schematic block diagram of the negotiating entities of protocol stacks 300, 350 within the host computer 110 and the CIP 210, respectively, for performing dynamic name negotiation operations.

The negotiating entities are preferably CLAW applications residing within lower-level layers (e.g., internetwork and data link layers) of the protocol stacks. As used herein, a CLAW application is similar to a service access point in that it identifies a particular port (or access point) to a higher-level layer in a network node involved in a data exchange. A CLAW control entity (CLAW CNTRL) is provided in each node as an application layered upon a CLAW driver layer (CLAW); the CLAW CNTRL application is configured to handle all CLAW option requests.

Specifically, a system validate exchange occurs between CLAW CNTRL processes executing on the host and CIP to activate a control link connection (shown as dashed lines 310) over channel 125. Once the control link is activated, a connection request sequence is invoked among these CLAW CNTRL processes over link 310 to establish a logical application-application link (shown as dashed-dotted lines 320) for transferring data in response to execution of CCWs of a channel program at the host and CIP. For example, the connection request sequence may be used to establish a data link 320 for initiating the flow of IP datagrams between APP1 processes on the host and the CIP.

Figure 4:
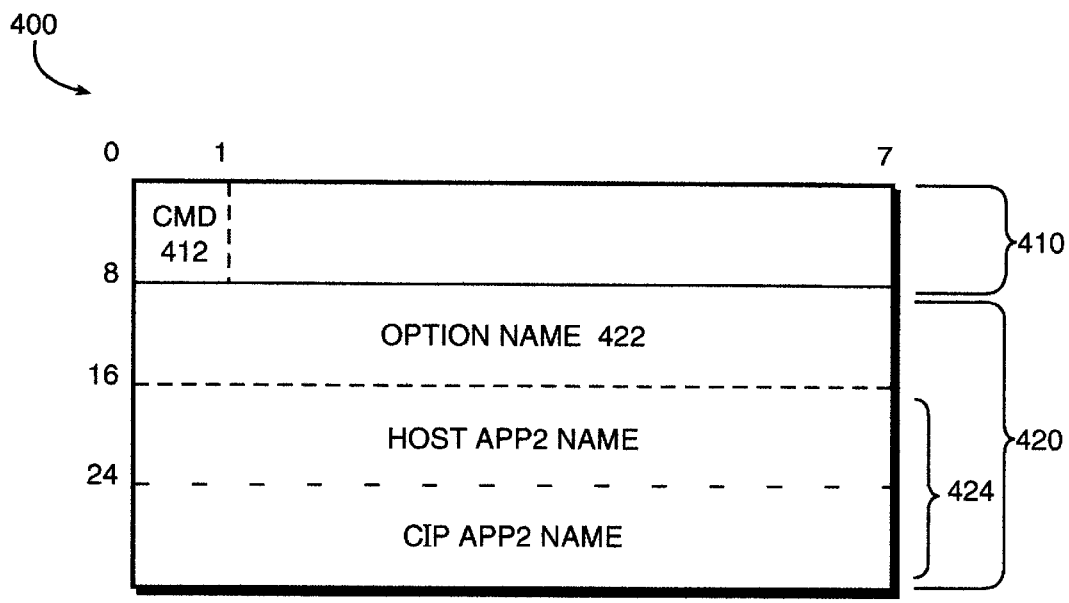
FIG. 4 is a block diagram of the format of an option request control message for initiating dynamic name negotiation.

To initiate dynamic name negotiation, the CLAW CNTRL process executing on, e.g., the host 110, functions as the requester by generating an option request message and transmitting it over the control link to the CIP 210 where it is received at its CLAW CNTRL process, i.e., the responder. FIG. 4 is a block diagram of the format of an option request control message 400 comprising an 8-byte header 410 and a 24-byte body 420. A 1-byte command (CMD) field 412 of the header 410 contains command codes specifying the type of message, such as an option request message (e.g., command code hex 31). The body 420 of the control message 400 includes an 8-byte option name (OPTION NAME) field 422 whose contents specify the name of the requested option. The body 420 also includes a 16-byte option parameter field 424 containing parameters specific to the requested option; in accordance with the present invention, the parameter field 424 contains the names of applications that the host and CIP are requested to create (e.g., HOST APP2 NAME and CIP APP2 NAME).

Figure 5:
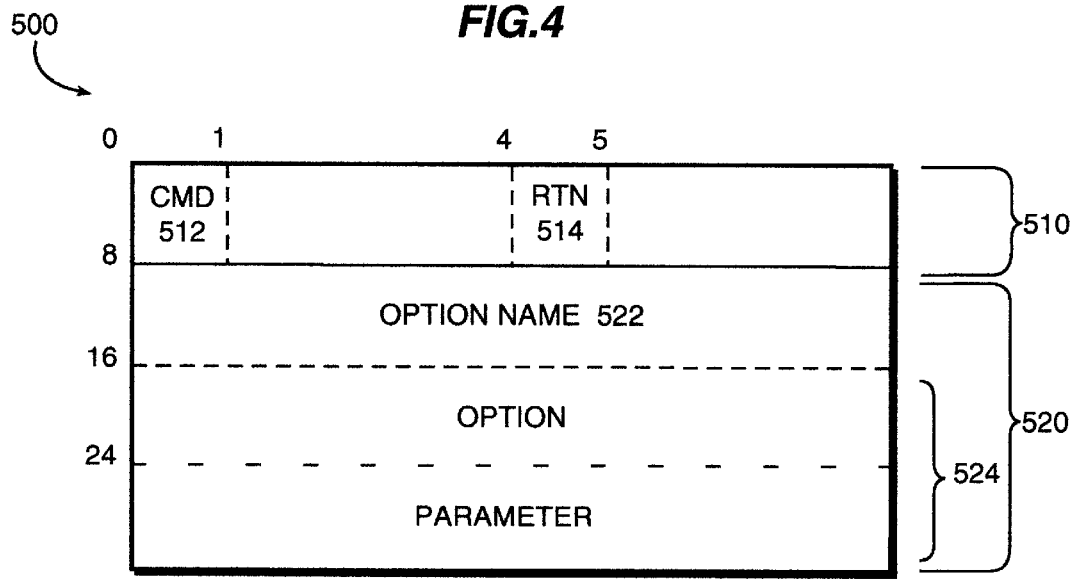
FIG. 5 is a block diagram of the format of an option request response control message for use with the dynamic name negotiation.

In response to receiving and interpreting the option request message 400, the CIP functions as a responder by returning an option request response. FIG. 5 is a block diagram illustrating the format of an option request response control message 500. As with the option request message 400, the option request response 500 comprises a header 510 having a 1-byte command (CMD) field 512 that contains command codes specifying the type of message, such as an option request response message (e.g., command code hex 32) and a 1-byte return (RTN) field 514 containing various return codes.

The response message 500 also comprises a body 520 including an 8-byte option name (OPTION NAME) field 522 whose contents are copied from field 422 and a 16-byte option-specific parameter (OPTION PARAMETER) field 524 containing any option-specific response parameters. If the responder "agrees" with the application names specified within the option request message, the field 524 contains the supplied names and an acknowledgement code is provided in field 514. Negotiation is thus complete and creation of the data link may proceed. That is, the CLAW CNTRL processes of the host 110 and CIP 210 interact in accordance with the connection request exchange to establish an additional data link (shown as solid lines 330) used for data communication between the HOST APP2 and CIP APP2 applications based upon the names negotiated in the option request (FIG. 4, field 424).

If, however, the responder does not agree with the application name supplied by the requesting node, a different CIP application name may be provided in the OPTION PARAMETER field 522 of the response message 500 and a specific error code (e.g., Is "CIP application name already in use") is loaded into the return field 514.

Advantageously, the inventive technique provides a means for a system to dynamically configure parameters for communication among nodes of the network as opposed to requiring static definitions of these configuration parameters by a customer. As a result, the technique enhances the overall performance and architecture of the system.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for dynamically negotiating logical names of applications executing on nodes of a computer network to create a data link for communication over a channel between the nodes, the method comprising the steps of:

creating a control message at a requesting node, the control message specifying a desired logical name to be used for an application to be created in a responding node;

transmitting the control message to the responding node over a control link of the channel;

interpreting the control message at the responding node as an instruction to create the application and to assign the desired logical name specified in the control message to the application when created;

if the responding node agrees to assign the desired application logical name to the application, returning a response control message from the responding node to the requesting node over the control link, the response control message containing the desired application logical name and an acknowledgement code; and if the responding node does not agree to assign to the application the desired application logical name, returning an alternate response control message from the responding node to the requesting node over the control link, the alternate response control message containing an error code specifying that the desired application logical name is already in use, and the alternate response control message also containing, in addition to the error code, an alternate logical name for the application to be used in the data link, the alternate logical name being different from the desired logical name.

2. The method of claim 1 further comprising the step of specifying, within the control message, the name of an application created in the requesting node.

3. The method of claim 2 further comprising the step of creating a logical data link between the applications specified in the control message.

4. Apparatus for dynamically negotiating logical names of applications executing on nodes of a computer network to create a data link for communication over a channel between the nodes, the apparatus comprising:

means for creating a control message at a requesting node, the control message specifying a desired logical name to be used for an application to be created in a responding node;

means for transmitting the control message to the responding node over a control link of the channel;

means for interpreting the control message at the responding node as an instruction to create the application and to assign the desired logical name specified in the control message to the application when created;

if the responding node agrees to assign the desired application logical name to the application, means for transmitting a response control message from the responding node to the requesting node over the control link, the response control message containing the desired application logical name and an acknowledgement code; and if the responding node does not agree to assign to the application the desired application logical name, means for returning an alternate response control message from the responding node to the requesting node over the control link, the alternate response control message containing an error code specifying that the desired application logical name is already in use, and the alternate response control message also containing, in addition to the error code, an alternate logical name for the application to be used in the data link, the alternate logical name being different from the desired logical name.

5. The apparatus of claim 4 further comprising means for specifying the name of an application created in the requesting node.

6. The apparatus of claim 5 further comprising means for creating a logical data link between the applications specified in the control message.

7. Computer-readable memory comprising computer-executable program instructions that when executed cause dynamic negotiation of logical names of applications executing on nodes of a computer network to create a data link for communication over a channel between the nodes, the program instructions comprising instructions that when executed cause:

creation of a control message at a requesting node, the control message specifying a desired logical name to be used for an application to be created in a responding node;

transmission of the control message to the responding node over a control link of the channel;

interpretation of the control message at the responding node as an instruction to create the application and to assign the desired logical name specified in the control message to the application when created;

if the responding node agrees to assign the desired application logical name to the application, return of a response control message from the responding node to the requesting node over the control link, the response control message containing the desired application logical name and an acknowledgement code; and if the responding node does not agree to assign to the application the desired application logical name, return of an alternate response code message from the responding node to the requesting node over the control link, the alternate response control message containing an error code specifying that the desired application logical name is already in use, and the alternate response control message also containing, in addition to the error code, an alternate logical name for the application to be used in the data link, the alternate logical name being different from the desired logical name.

8. Computer-readable memory of claim 7 wherein the instructions when executed also cause the name of an application created in the requesting node to be specified within the control message.

9. Computer-readable memory of claim 8 wherein the instructions when executed also cause creation of a logical data link between the applications specified in the control message.

10. A method implemented by a requesting node to dynamically negotiate logical names of applications to create a data link for communication over a channel, the method comprising the steps of:

creating a control message specifying a desired logical name to be used for an application to be created in a responding node;

transmitting the control message to the responding node over a control link of the channel;

if the responding node agrees to assign the desired application logical name to the application, the response control message containing the desired application logical name and an acknowledgement code;

if the responding node does not agree to assign to the application the desired application logical name, receiving an alternate response control message from the responding node, the alternate response control message containing an error code specifying that the desired application logical name is already in use, and the alternate response control message also containing, in addition to the error code, an alternate logical name for the application to be used in the data link, the alternate logical name being different from the desired logical name.

11. The method of claim 10 further comprising the step of specifying, within the control message, the name of an application created in the requesting node.

12. Apparatus for dynamically negotiating logical names of applications to create a data link for communication over a channel, the apparatus comprising a requesting node comprising:

means for creating a control message specifying a desired logical name to be used for an application to be created in a responding node;

means for transmitting the control message to the responding node over a control link of the channel;

if the responding node agrees to assign the desired application logical name to the application, means for receiving a response control message from the responding node, the response control message containing the desired application logical name and an acknowledgement code; and if the responding node does not agree to assign to the application the desired application logical name, means for receiving an alternate response control message from the responding node, the alternate response control message containing an error code specifying that the desired application logical name is already in use, and the alternate response control message also containing, in addition to the error code, and alternate logical name for the application to be used in the data link, the alternate logical name being different from the desired logical name.

13. The apparatus of claim 12, the requesting node further comprising means for specifying in the control message the name of an application created in the requesting node.

14. Computer-readable memory comprising computer-executable program instructions that when executed by a requesting node cause dynamic negotiation of logical names of applications to create a data link for communication over a channel, the program instructions comprising instructions that when executed by the requesting node cause:

creation of a control message specifying a desired logical name to be used for an application to be created in a responding node;

transmission of the control message to the responding node over a control link of the channel;

if the responding node agrees to assign the desired application logical name to the application, receipt of a response control message from the responding node, the response control message containing the desired application logical name and an acknowledgement code; and if the responding node does not agree to assign to the application the desired application logical name, receipt of an alternate response code message from the responding node, the alternate response control message containing an error code specifying that the desired application logical name is already in use, and the alternate response control message also containing, in addition to the error code, an alternate logical name for the application to be used in the data link, the alternate logical name being different from the desired logical name.

15. Computer-readable memory of claim 14 wherein the instructions when executed by the requesting node also cause the name of an application created in the requesting node to be specified within the control message.

16. A method implemented by a responding node to dynamically negotiate logical names of application to create a data link for communication over a channel, the method comprising the steps of:

receiving a control message from a requesting node, the control message specifying a desired logical name to be used for an application to be created in the responding node;

interpreting the control message as an instruction to create the application and to assign the desired logical name specified in the control message to the application when created;

if the responding node agrees to assign the desired application logical name to the application, returning a response control message to the requesting node over the control link, the response control message containing the desired application logical name and an acknowledgement code; and if the responding node does not agree to assign to the application the desired application logical name, returning an alternate response control message to the requesting node over the control link, the alternate response control message containing an error code specifying that the desired application logical name is already in use, and the alternate response control message also containing, in addition to the error code, and an alternate logical name for the application to be used in the data link, the alternate logical name being different from the desired logical name.

17. The method of claim 16, wherein within the control message is also specified the name of an application created in the requesting node.

18. Apparatus for dynamically negotiating logical names of applications to create a data link for communication over a channel, the apparatus comprising a responding node comprising:

means for receiving a control message from a requesting node, the control message specifying a desired logical name to be used for an application to be created in the responding node;

means for interpreting the control message as an instruction to create the application and to assign the desired logical name specified in the control message to the application when created;

if the responding node agrees to assign the desired application logical name to the application, means for transmitting a response control message to the requesting node over the control link, the response control message containing the application logical name and an acknowledgement code; and if the responding node does not agree to assign to the application the desired application logical name, means for returning an alternate response control message to the requesting node over the control link, the alternate response control message containing an error code specifying that the desired application logical name is already in use, and the alternate response control message also containing, in addition to the error code, an alternate logical name for the application to be used in the data link, the alternate logical name being different from the desired logical name.

19. The apparatus of claim 18 wherein the control message also specifies the name of application created in the requesting node.

20. Computer-readable memory comprising computer-executable program instructions that when executed by a responding node cause dynamic negotiation of logical names of applications to create a data link for communication over a channel, the program instructions comprising instructions that when executed by the responding node cause:

reception of a control message from a requesting node, the control message specifying a desired logical name to be used for an application to be created in the responding node;

interpretation of the control message as an instruction to create the application and to assign the desired logical name specified in the control message to the application when created;

if the responding node agrees to assign the desired application logical name to the application, return of a response control message to the requesting node over the control link, the response control message containing the desired application logical name and an acknowledgement code; and if the responding node does not agree to assign to the application the desired application logical name, return of an alternate response code message to the requesting node over the control link, the alternate response control message containing an error code specifying that the desired application logical name is already in use, and the alternate response control message also containing, in addition to the error code, an alternate logical name for the application to be used in the data link, the alternate logical name being different from the desired logical name.

21. Apparatus for dynamically negotiating logical names of applications to create a data link for communication over a channel, the apparatus comprising a responding node comprising:

a receiver that receives a control message from a requesting node, the control message specifying a desired logical name to be used for an application to be created in the responding node;

an interpreter that interprets the control message as an instruction to create the application and to assign the desired logical name specified in the control message to the application when created;

if the responding node agrees to assign the desired application logical name to the application, a transmitter that transmits a response control message to the requesting node over the control link, the response control message containing the application logical name and an acknowledgement code; and if the responding node does not agree to assign to the application the desired application logical name, a mechanism that returns an alternate response control message to the requesting node over the control link, the alternate response control message containing an error code specifying that the desired application logical name is already in use, and the alternate control message also containing, in addition to the error code, an alternate logical name for the application to be used in the data link, the alternate logical name being different from the desired logical name.

22. The apparatus of claim 21, wherein the control message also specifies the logical name of an application created in the requesting node.

* * * * *